United States Patent [19]

Ohoka et al.

[11] Patent Number: 5,109,309

[45] Date of Patent: Apr. 28, 1992

[54] CASSETTE LOADING DEVICE FOR LOADING TAPE CASSETTE HAVING DIFFERENT SHAPES AND DIFFERENT DIMENSIONS TO A TAPE DRIVING POSITION

[75] Inventors: Satoshi Ohoka, Yokohama; Seiji Tomita, Yokosuka; Katsuya Hirakui, Ootawara, all of Japan

[73] Assignee: Kabushiki Kaisha Toshiba, Kawasaki, Japan

[21] Appl. No.: 523,893

[22] Filed: May 16, 1990

[30] Foreign Application Priority Data

May 19, 1989 [JP] Japan .................................. 1-125912

[51] Int. Cl.⁵ ..................... G11B 23/04; G11B 15/675
[52] U.S. Cl. .................................................... 360/94
[58] Field of Search ........................... 360/94, 85, 132

[56] References Cited

U.S. PATENT DOCUMENTS

| | | | |
|---|---|---|---|
| 4,558,384 | 12/1985 | Umeda | 360/94 |
| 4,559,574 | 12/1985 | Umeda | 360/132 |
| 4,853,805 | 8/1989 | Baranski | 360/94 |
| 4,866,550 | 9/1989 | Ohashi et al. | 360/94 |
| 4,992,894 | 2/1991 | Ohashi | 360/94 |

FOREIGN PATENT DOCUMENTS

| | | |
|---|---|---|
| 0091808 | 10/1983 | European Pat. Off. . |
| 0286751 | 10/1988 | European Pat. Off. . |
| 0302176 | 2/1989 | European Pat. Off. . |
| 0335271 | 10/1989 | European Pat. Off. . |

Primary Examiner—John H. Wolff
Attorney, Agent, or Firm—Cushman, Darby & Cushman

[57] ABSTRACT

A full cassette and a C cassette having different shapes and different dimensions are received in a tray moved to a cassette inserting position, with their feed reels coaxially positioned. As a tray is moved by a tray moving mechanism, the full cassette and C cassette are moved to a tape driving position while being protected by the tray and their feed reels are mounted on a common feed reel stand at the tape driving position. As the feed reel stand can be shared by the full cassette and C cassette, a cassette loading device can have a simple structure.

3 Claims, 13 Drawing Sheets

CASSETTE LOADING DEVICE FOR LOADING TAPE CASSETTE HAVING DIFFERENT SHAPES AND DIFFERENT DIMENSIONS TO A TAPE DRIVING POSITION

BACKGROUND OF THE INVENTION

1. Field of the Invention

The present invention relates to a video tape recorder (VTR) in a VHS system, and more particularly, to a cassette loading device to load cassettes of different shapes and different dimension, such as a VHS full cassette and a VHS compact cassette (C cassette) in a tape driving section.

2. Description of the Related Art

In general, a VTR is designed to be able to drive a full cassette and a C cassette as recording media of different shapes and different dimensions where a magnetic tape is reeled between a feed reel and a take-up reel. In using the full cassette, forcefully inserting the cassette in to a cabinet drives a cassette loading device. Then, the cassette loading device conveys and loads the cassette in a tape driving section. To use a smaller C cassette instead of the full cassette, it is accommodated in a separate C cassette adapter of almost the same shape and dimension as the full cassette. When this C cassette adapter is forcefully inserted into the cabinet, the cassette loading device conveys the adapter to the driving section for loading the C cassette.

However, conventional VTRs are designed such that forcibly inserting a full cassette or a cassette adapter holding a C cassette into the cabinet drives the cassette loading device to convey and load the cassette in the tape driving section. The full cassette and C cassette adapter may be damaged when loaded into or unloaded from the cabinet, thus degrading the reliability.

Therefore, there is a growing demand for a cassette loading device which can ensure a simple and easy loading operation for different full and C cassettes of different shapes and different dimensions and ensure a highly reliable cassette loading/unloading operation.

SUMMARY OF THE INVENTION

Accordingly, it is an object of this invention to provide a cassette loading device which is capable to realize a simple and easy handling of a plurality of tape cassettes of different shapes and dimensions and a highly reliable cassette loading/unloading operation with a simple structure.

To achieve the above object, there is provided a cassette loading device for loading a first tape cassette or second tape cassette having a different shape and dimension from the first tape cassette having a magnetic tape reeled between a feed reel and a take-up reel from a cassette inserting position to a tape driving position lower than a predetermined position on a line horizontally extending from the cassette inserting position, which device comprises:

a tray for receiving the first and second tape cassettes with feed reels coaxially positioned, and conveying the first or second cassette from the cassette inserting position to the tape driving position; and a tray moving mechanism for guiding the tray to convey the first or second tape cassette to the cassette inserting position and the tape driving position.

DETAILED DESCRIPTION OF THE PREFERRED EMBODIMENT

A preferred embodiment of this invention will now be described referring to the accompanying drawings.

Figure 1:
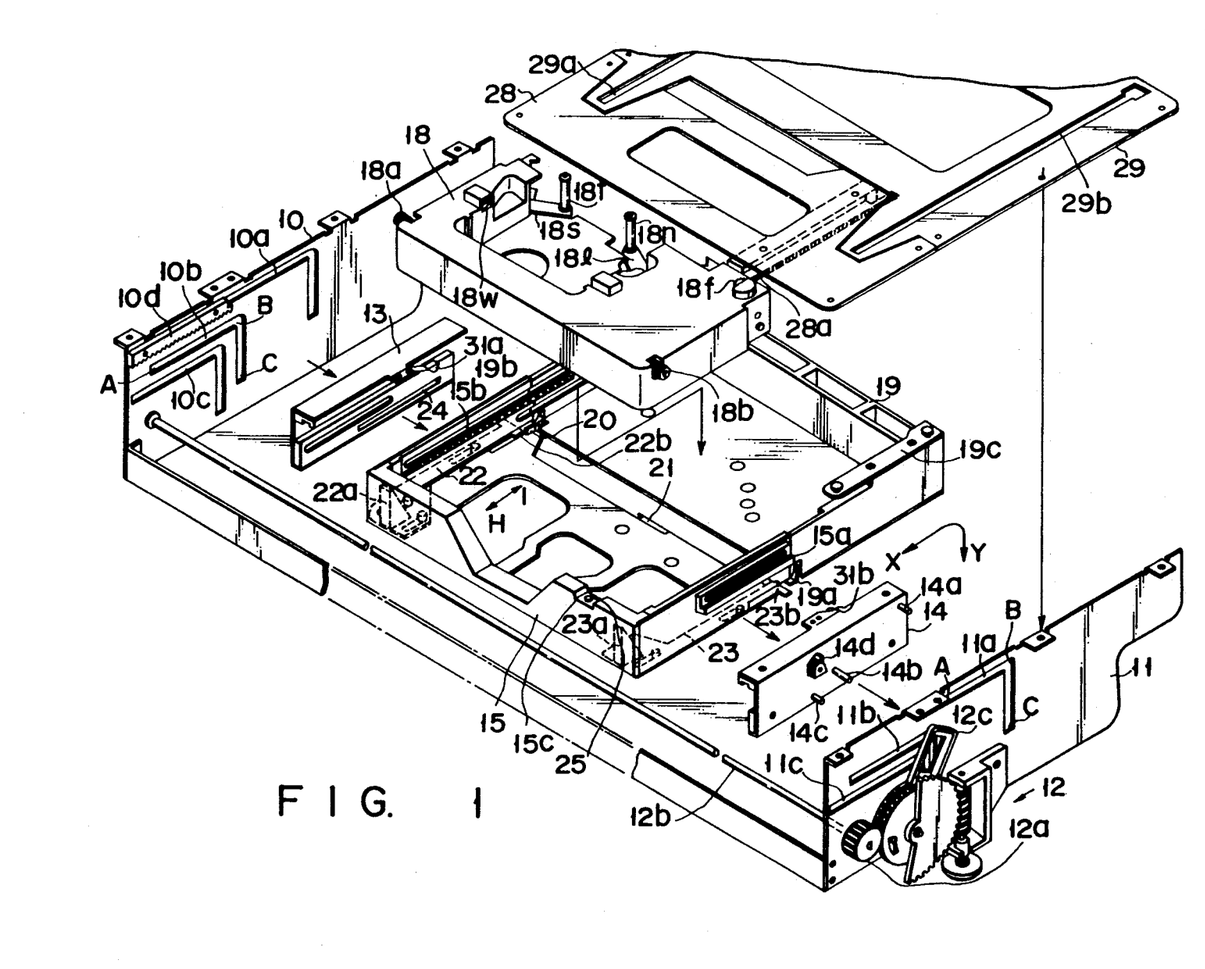
FIG. 1 is an exploded perspective view illustrating a cassette loading device of one embodiment of the present invention.

FIG. 1 shows a cassette loading device according to one embodiment of this invention. First and second side chassis 10 and 11 are protrusively provided with a predetermined interval on a main chassis (not shown). First to third guide holes 10a to 10c having a nearly L shape and first to third guide holes 11a to 11c also having a nearly L shape are formed respectively on the first and second side chassis 10 and 11 in association with a cassette inserting position (A), and a tape driving position (C) which lies below a predetermined position (B) on a line extending from the cassette inserting position. A tray moving mechanism 12 is located on one side of each chassis (only on shown for the sake of diagrammatic convenience). These mechanisms 12 are coupled to move in synchronism with each other through coupling gears 12a and a connecting bar 12b. Side racks 10d which constitute a double-speed mechanism are located, facing each other, on the first and second chassis 10 and 11 (only one side rack on the side of the first chassis being shown for the sake of diagrammatic convenience).

The first and second holder members 13 and 14 are placed face to face between the first and second side chassis 10 and 11. First to third guide portions 14a to 14c are located on each of the first and second holder member 13 and 14 (in FIG. 1, only the second holder member being shown for the sake of diagrammatic convenience), and are guidably inserted in the first to third guide holes 10a to 10c and 11a to 11c of the respective first and second side chassis 10 and 11 in the directions of arrows X and Y. Of these guide portions the second guide portions 14b are engaged with respective loading arms 12c of the tray moving mechanisms 12 in such a manner as to be able to transmit a driving force. On the first and second holder members 13 and 14 are provided double-speed gears 14d (only those on the second holder member for the sake of diagrammatic convenience), and the gears 14d are engaged with the respective side racks 10d of the first and second side chassis 10 and 11 (only the engagement on the first side chassis being shown for the sake of diagrammatic convenience).

A first tray 15 is arranged between the first and second holder members 13 and 14. The first tray 15 constitutes a cassette conveying tray and is movably arranged in the directions of the arrows X and Y. The first tray 15 is adapted to receive, for example, a VHS full cassette 16 with a feed reel 161 and a take-up reel 162 shown in FIG. 20 or a VHS compact cassette (a C cassette) 17 with a feed reel 171 and a take-up reel 172 shown in FIG. 2A in such a way that the feed reels 161 and 171 are coaxially positioned. The C cassette 17 is to be placed inside a C cassette adapter 18 having nearly the same shape and dimension as the full cassette 16 and is received in the first tray 15. A second tray 19 is removably connected at the base of the first tray 15, via a tray coupling mechanism, such as a coupling spring member 19a (see FIGS. 3A and 3B). The second tray 19 receives the C cassette adapter 18 accommodated in the first tray 15. The second tray 19 is interlocked with downward movement of the first tray 15 from position B to position C to be released from the coupling spring members 19a, and is held at the stand-by position on the line horizontally extending position B (refer to FIG. 3B). Then, the tray 19 is interlocked with elevation of the tray 15 from position C to position B to be coupled to the coupling spring member 19a so that the tray 19 is conveyed together with the first tray 15 (refer to FIG. 3A). The first tray 15 has outer racks 15a (only one shown in FIG. 1 for diagrammatic convenience) provided on its both sides. The outer racks 15a are engaged the double-speed gears 14d of the first and second holder members 13 and 14. As a result, the moving speed of the first and second holder members 13 and 14 through the double-speed gears 14d, and the first tray 15 is moved to the cassette inserting position protruding from the front panel as will be described later.

Figure 4:
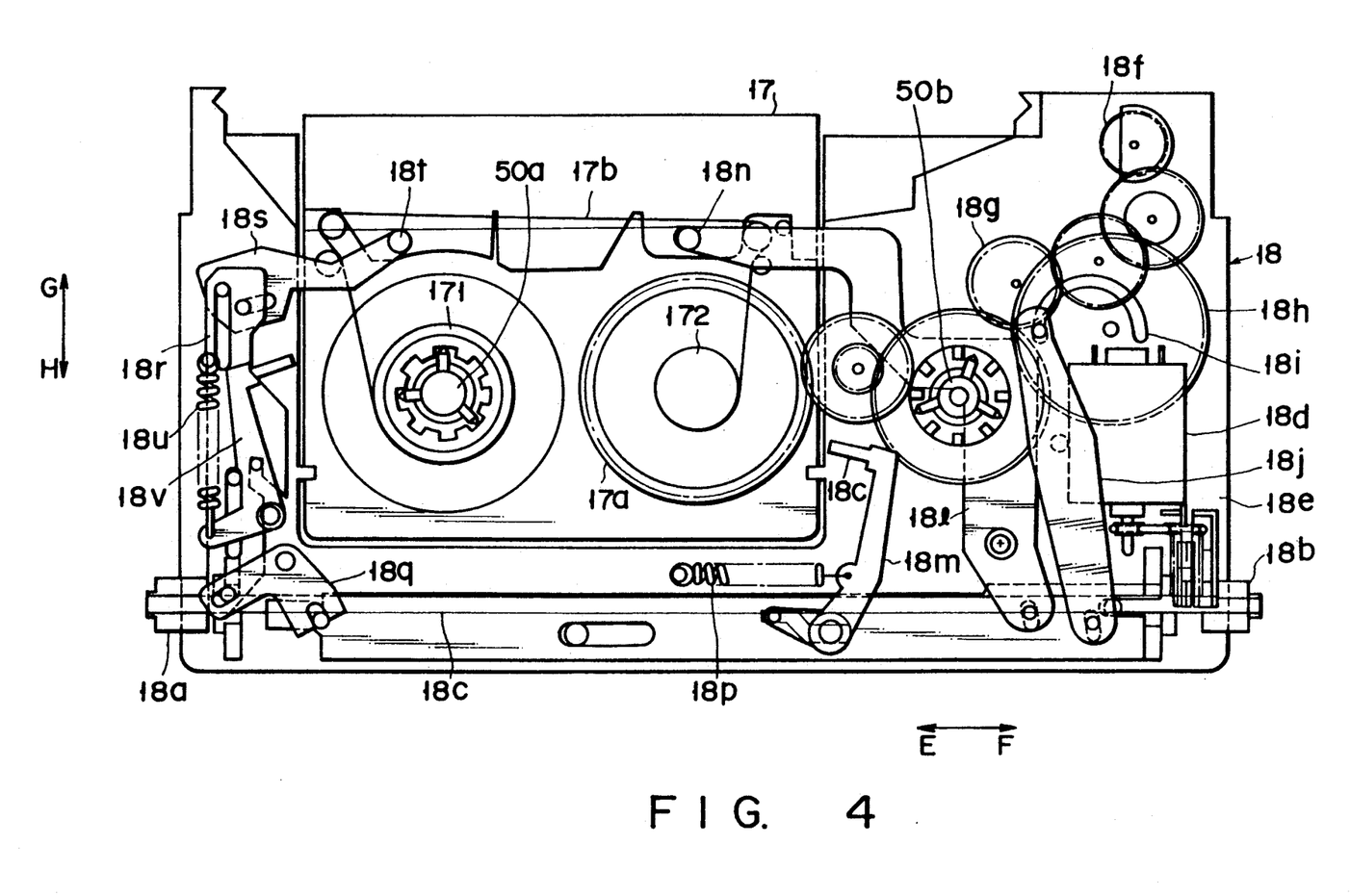
FIG. 4 is a plan view illustrating the C cassette being held in the C cassette adapter.

On the inner walls of the first and second trays 15 and 19, a pair of inner racks 15b and 19b and another pair of inner racks 15b and 19b (only one in each pair being shown for the sake of diagrammatic convenience), which constitute a mobile mechanism, are provided, and are engaged with mobile gears 18a and 18b provided on the C cassette adapter 18. As shown in FIG. 4, these mobile gears 18a and 18b are connected via a connecting bar 18c, and the driving force of a built-in motor 18d is transmitted through a belt transmitting mechanism 18e. When the driving force of the built-in motor 18d is transmitted to the mobile gears 18a and 18b, therefore, the C cassette adapter 18 is guided in the inner racks 15b and 19b of the trays 15 and 19 and conveyed o the first or second tray 15 or 19.

Figure 2A:
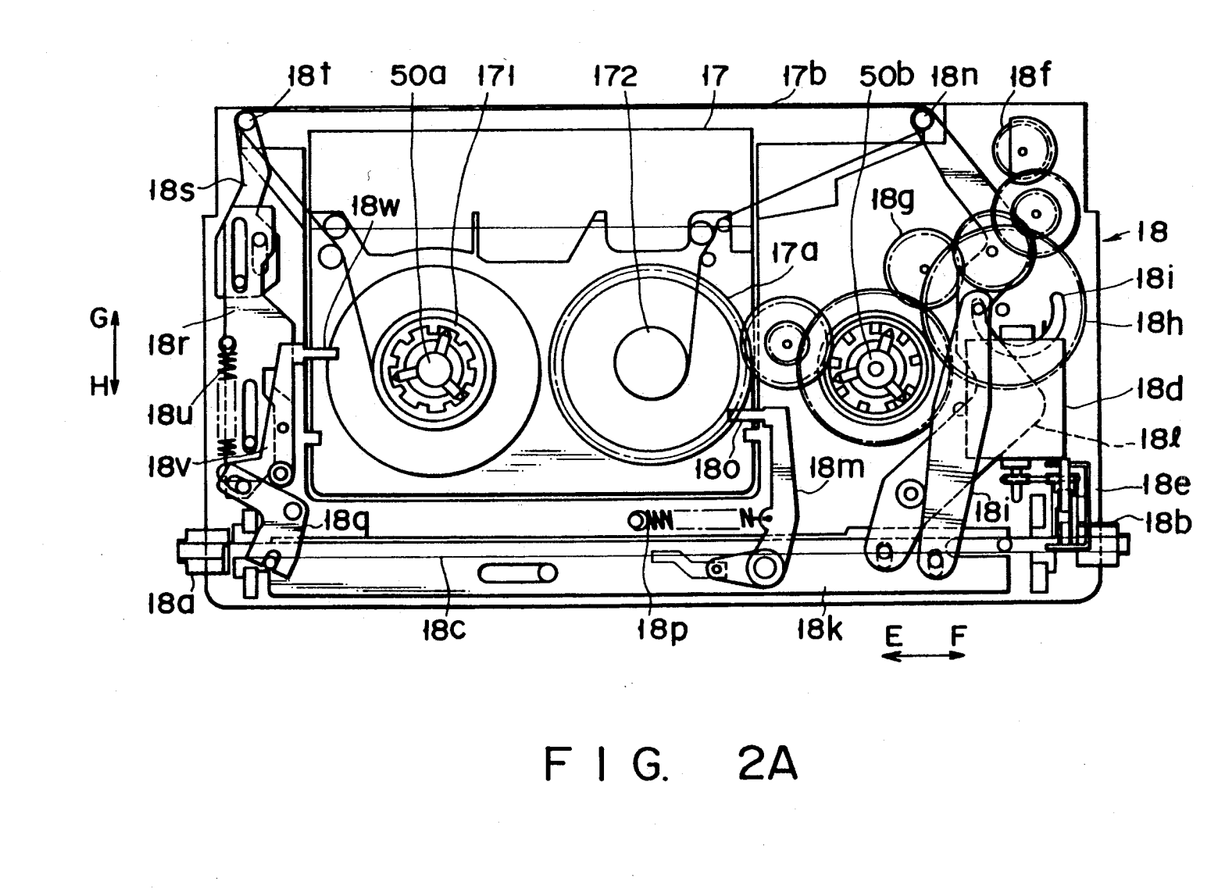
FIG. 2A is a plan view illustrating a C cassette held in a C cassette adapter being loaded on a reel stand.
Figure 3A:
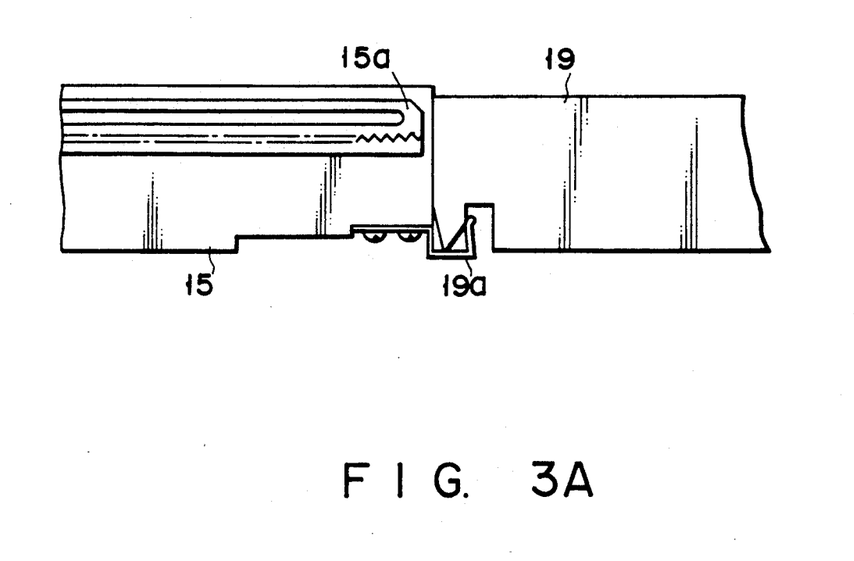
FIGS. 3A and 3B are side views for explaining how the first and second trays in FIG. 1 are coupled.
Figure 3B:
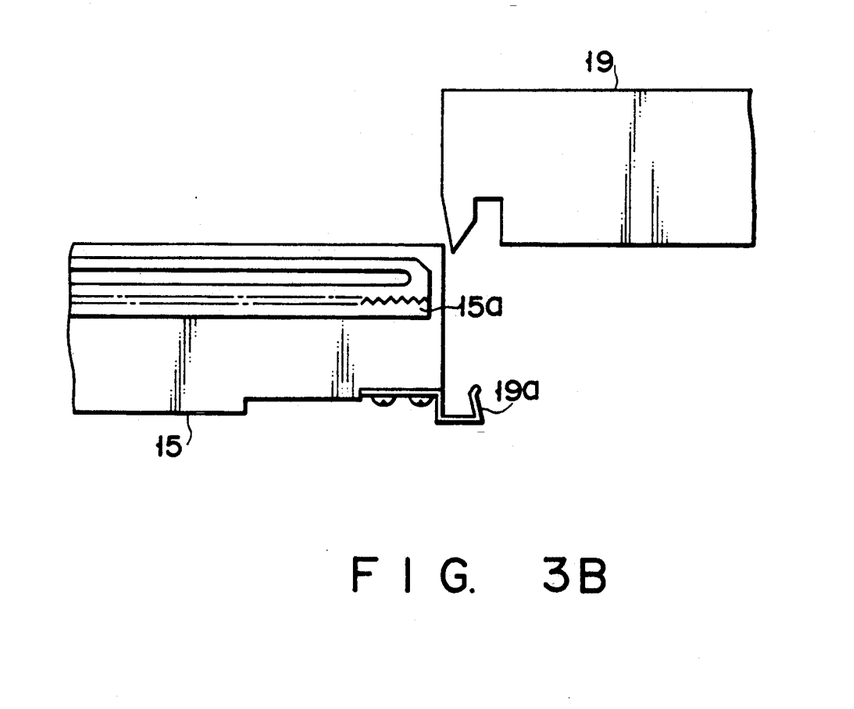

A loading gear 18f is also provided on the C cassette adapter 18. As shown in FIG. 2A, the loading gear 18f is engaged with a cam gear 18h through a gear transmitting mechanism 18g, and is engaged with a take-up gear 17a which is fitted to the take-up reel 172 of the C cassette 17. A driving cam 18i, which is engaged with one end of a cam lever 18j for loading driving, is engaged with the cam gear 18h. The cam lever 18j has the center portion rotatably supported, and has the other end attached to one end of a first control slider 18k. The first control slider 18k is movable in the directions of arrows E and F, and supports, at its center portion, one end of each of a right loading arm 181 and a right cassette pressing member 18m. The right loading arm 181 has its center portion rotatably supported, and the other end provided with an engaging post 18n to draw a tape 17b of the C cassette 17. The right cassette pressing member 18m has its center portion rotatably supported, and the other end provided with an engaging section 18o in association with the C cassette 17. Therefore, the pressing member 18m is given a spring force in the counterclockwise direction as shown in FIG. 2A via a spring member 18p.

One end of a second control slider 18r is supported by the first control slider 18k through an intermediate lever 18q. The second control slider 18r is movably supported in the directions of arrows G and H, and has its distal end attached with one end of a left loading arm 18s. The left loading arm 18s is interlocked with the movement of the second control slider 18r in the G and H directions so that its rotation is controlled. The loading arm 18s has its distal end provided with an engaging post 18t for drawing the tape of the C cassette 17. The second control slider 18r has the center portion engaged with one end of a spring member 18 whose other end is engaged with one end of a left cassette pressing member 18v. The left cassette pressing member 18v has the center portion rotatably supported, and an engaging section 18w is formed at the other end of the member 18v in association with the C cassette 17.

Figure 2B:
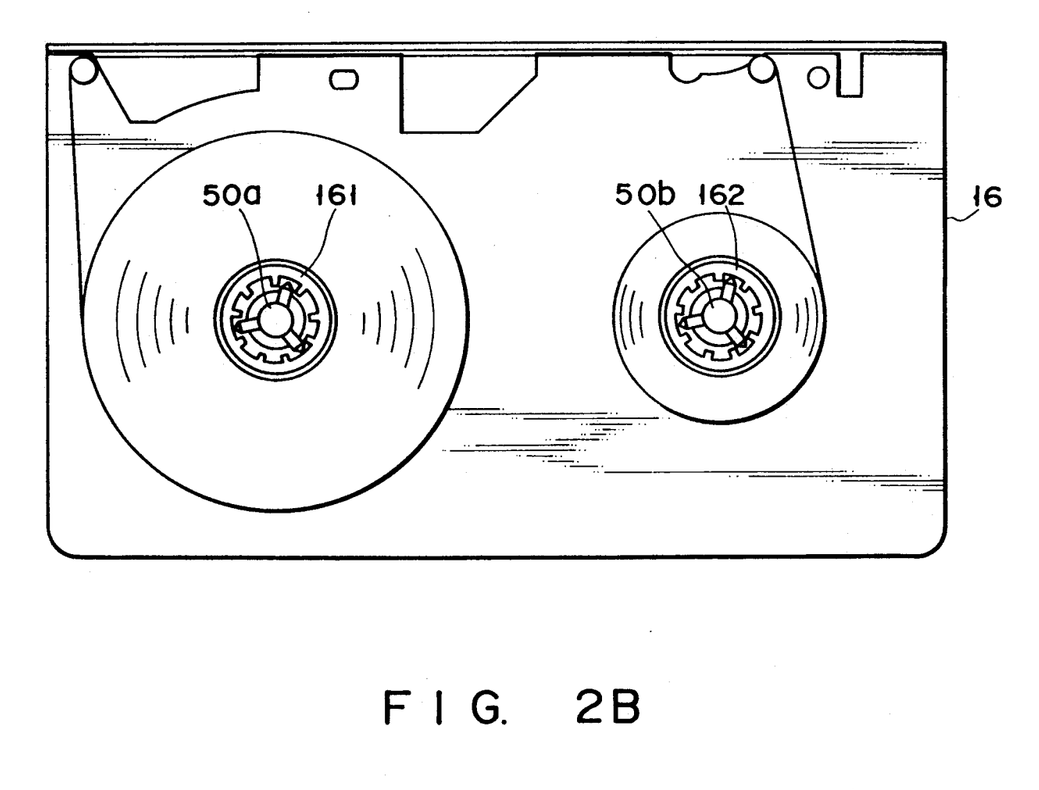
FIG. 2B is a plan view illustrating a full cassette being loaded on the reel stand.

With the above structure of the C cassette adapter 18, the loading gear 18f is interlocked with the cassette loading/unloading to rotate clockwise or counterclockwise in FIG. 2 as will be described later. Then, interlocking with the rotation, the tape 17b of the received C cassette 17 is fed and taken up as shown in drives the gear transmitting mechanism 18g to rotate the take-up reel of the C cassette 17 so as to feed and take up the tape 17b. At the same time, the loading gear 18f controls the rotation of the cam lever 18j by driving the cam gear 18h clockwise or counterclockwise in FIG. 2A. The cam lever 18j controls the movement of the first control slider 18k in the E and F direction which controls the rotation of the right loading arm 181 clockwise and counterclockwise in FIGS. 2A and 4 to thereby feed or take up the tape 17b. At this time, the first control slider 18k controls the movement of the second control slider 18r to move in the G and H directions through the intermediate lever 18q, and also controls the movement of the left loading arm 18s counterclockwise or clockwise in FIG. 2A, ensuring feeding or taking up of the tape 17b. At the same time, the first control slider 18k controls the rotation of the left cassette pressing member 18v clockwise or counterclockwise so as to engage or disengage the C cassette 17 (see FIGS. 2A and 4).

Figure 5:
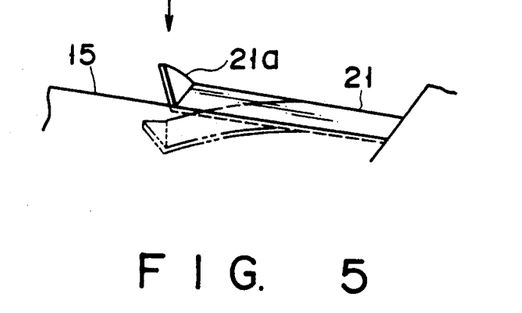
FIG. 5 is a perspective view illustrating part of the operational state wrong-insertion preventing members.
Figure 6A:
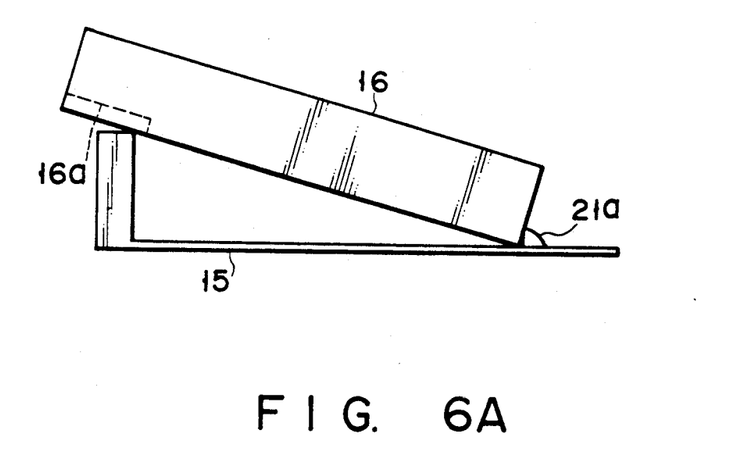
FIGS. 6A and 6B are side views illustrating the operational state of the wrong-insertion preventing members at the time of loading the full cassette.
Figure 6B:
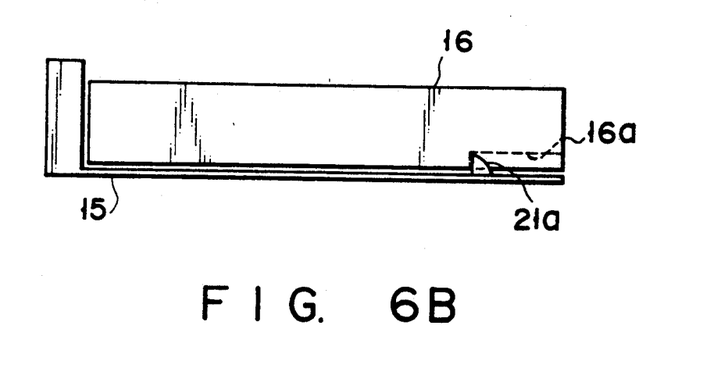
Figure 7A:
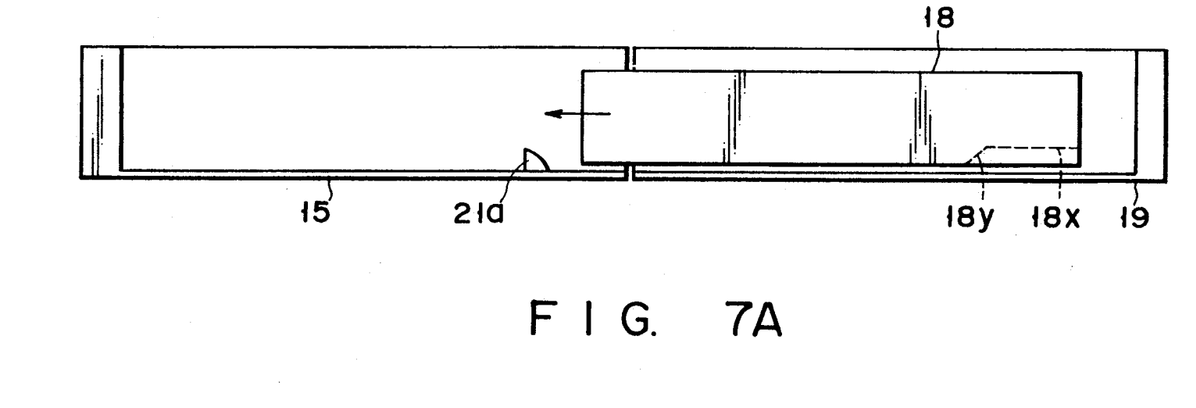
FIGS. 7A to 7D are side views illustrating the operational state of the wrong-insertion preventing members at the time of loading the C cassette adapter.
Figure 7B:
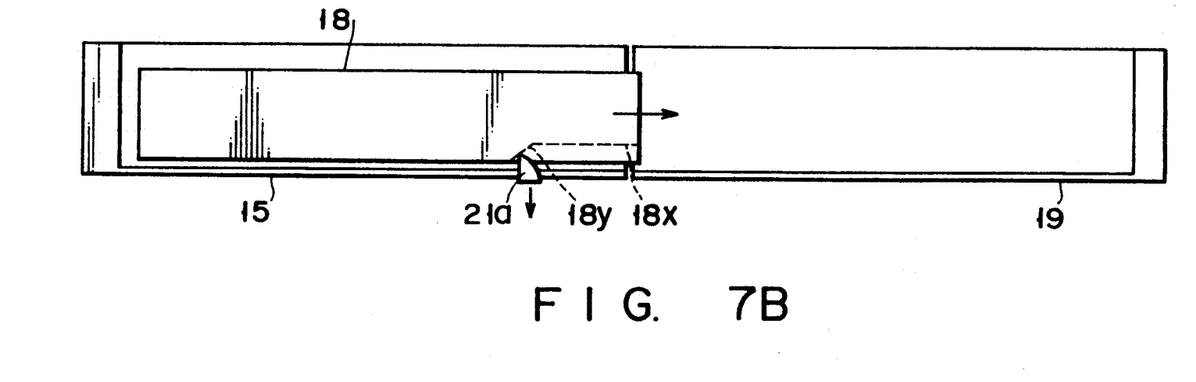
Figure 7C:
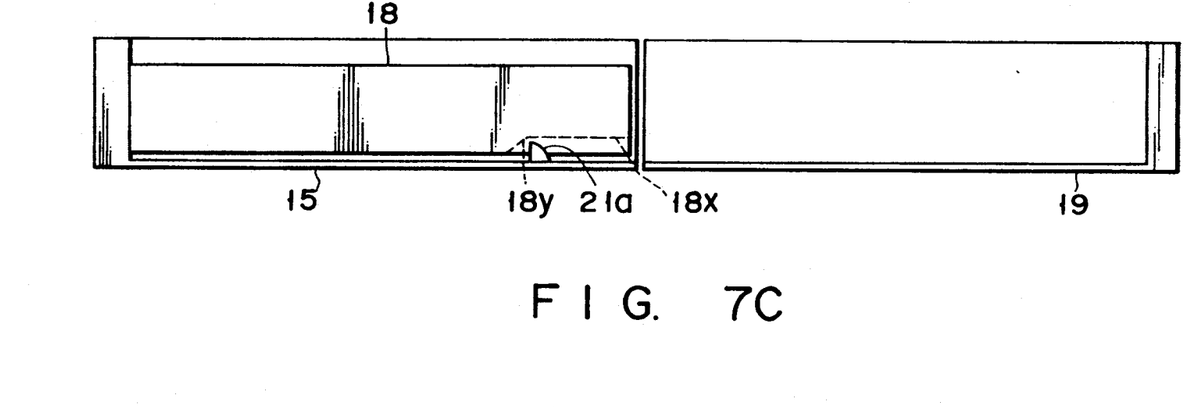
Figure 7D:
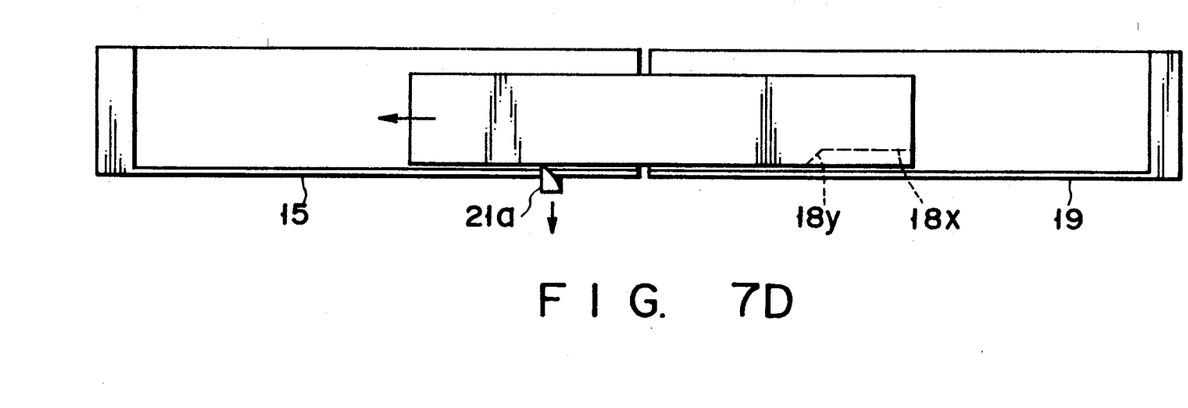

The first tray 15 is provided with a cassette positioning section 20 and a wrong-insertion preventing member 21 in association with the position at which the full cassette is received. The cassette positioning section 20 is arranged at a position not to interfere with the movement of the C cassette adapter 18 toward the first and second trays 15 and 19. The member 21 has pawl 21a flexible in the direction of the arrow head as shown in FIG. 5. Referring to FIGS. 6A and 6B, the pawl 21a is provided in association with a recess 16a formed in a predetermined direction of the full cassette 16.

The wrong-insertion preventing member 21 corresponds to a recessed engaging portion 18x formed in the C cassette adapter 18 as shown in FIGS. 7A to 7D. The engaging portion 18x has an inclined portion 18y for releasing the engagement of the pawl, so as to facilitate disengagement of the pawl 21a of the member 21 from the first tray 15 at the time of moving the second tray 19. At the time the C cassette adapter 18 is moved toward the first and second trays 15 and 19, the member 21 allows the movement of the C cassette adapter 18 due to its elasticity, and surely prevents the wrong insertion of the full cassette 16. In other words, in loading the full cassette 16 in the first tray 15, the member 21 hinders the insertion of the full cassette 16 when the recessed side of the cassette 16 is not inserted as shown in FIG. 6A, but allows insertion of the full cassette when the recessed side is inserte as shown in FIG. 6B, thus preventing the wrong insertion. As shown in FIGS. 7A to 7D, at the time the C cassette adapter 18 is loaded on or unloaded from the first tray 15, the member 21 is pressed against the bottom of the C cassette adapter 18 because of its elasticity to be engaged with or disengaged from the engaging portion 18x, thus permitting loading/unloading of the C cassette adapter 18.

Figure 8A:
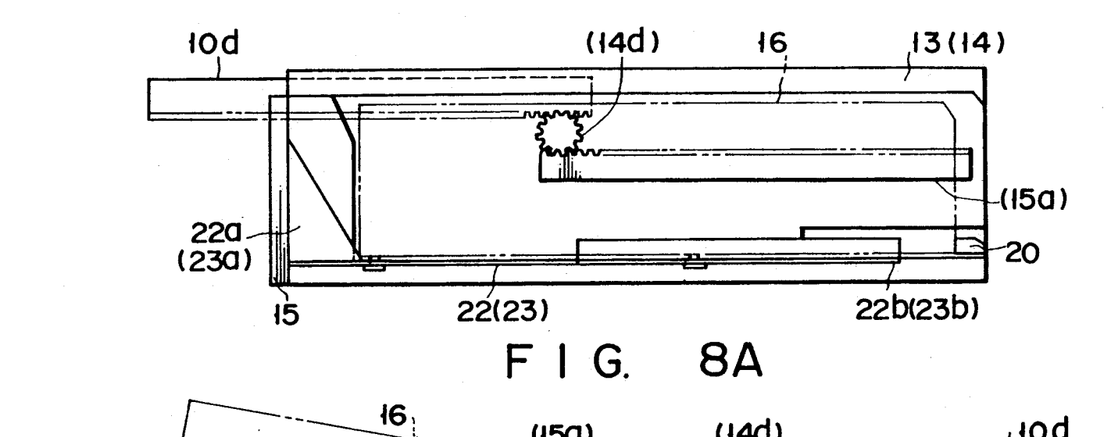
FIGS. 8A and 8B are side views for explaining a pop-up operation of the full cassette.
Figure 8B:
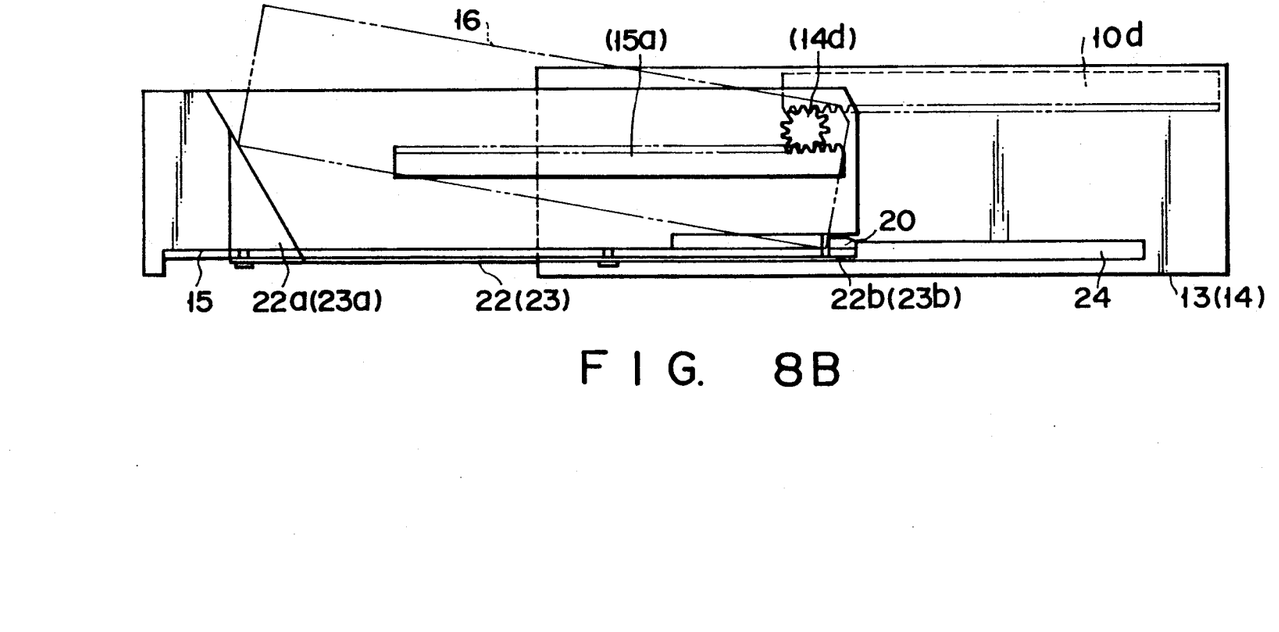

Pop-up sliders 22 and 23 are provided on the bottom of the first tray 15 at both end portions thereof in a manner movable in the directions of arrows H and I. These pop-up sliders 22 and 23 have inclined portions 22a and 23a formed on one ends on the front panel side, and have engaging portions 22b and 23b formed on the other ends. As shown in FIGS. 8A and 8B, the engaging portions 22b and 23b are guidably inserted into guide sections 24 formed in the first and second holder members 13 and 14 (only one section 24 on the side of the first holder member is shown in FIG. 1 for diagrammatic convenience). When the full cassette 16 is inserted with the pop-up sliders 22 and 23 being ejected to the cassette inserting position (see FIG. 8B) and the first tray 15 is moved in toward the tape driving position, the pop-up sliders 22 and 23 are guided in the guide sections 24 of the first and second holder members 13 and 14 and are moved together in the same direction. As a result, due to its tare, the full cassette 16 slightly moves the pop-up sliders 22 and 23 in the ejecting direction, and it is accommodated in a predetermined position of the first tray 15 with its leading end restricted to the cassette positioning section (see FIG. 8A). When the first tray 15 is ejected to the cassette inserting position from the tape driving section, the pop-up sliders 22 and 23 are moved together in the ejecting direction and the engaging portions 22b and 23b abut on the end portions of the guide sections 24. When the first tray 15 is further ejected, with the engaging portions 22b and 23b of the pop-up sliders 22 and 23 being engaged with the end portions of the guide sections 24, only the first tray 15 is moved to the cassette inserting position. The pop-up sliders 22 and 23 lift up the base portion of the full cassette 16 whose leading end is restricted by the cassette positioning section 20, at the inclined portions 22a and 23a, to execute a so-called pop-up operation (see FIG. 8B). The full cassette 16 on the first tray 15 ejected at the cassette inserting position can be removed by holding the base portion.

A cutaway portion (not shown) is formed in the C cassette adapter 18 so as to prevent the pop-up action at the inclined portions 22a and 23a of the pop-up sliders 22 and 23.

Figure 9A:
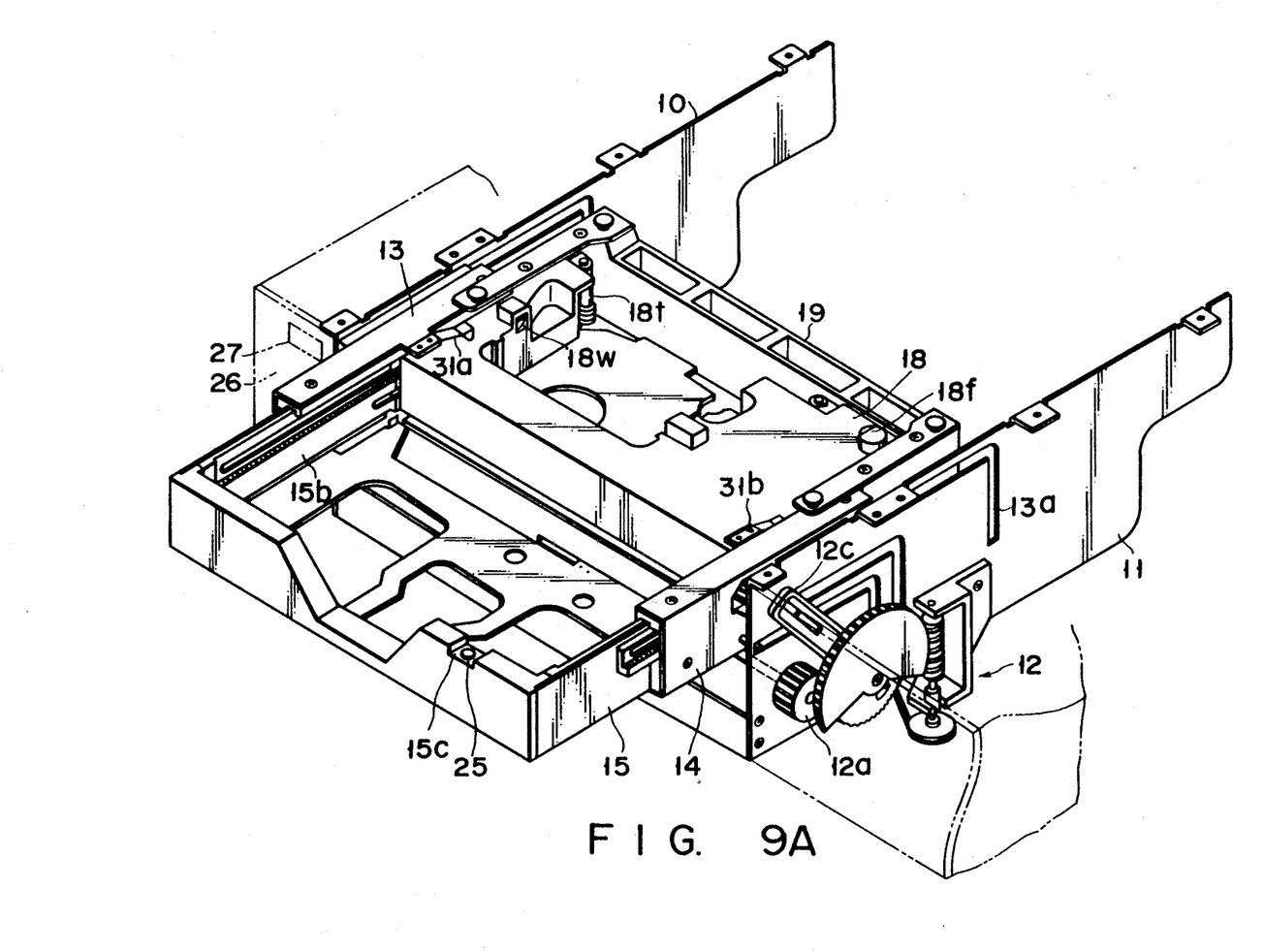
FIG. 9A is a perspective view illustrating a tray being conveyed to the cassette inserting position.
Figure 9B:
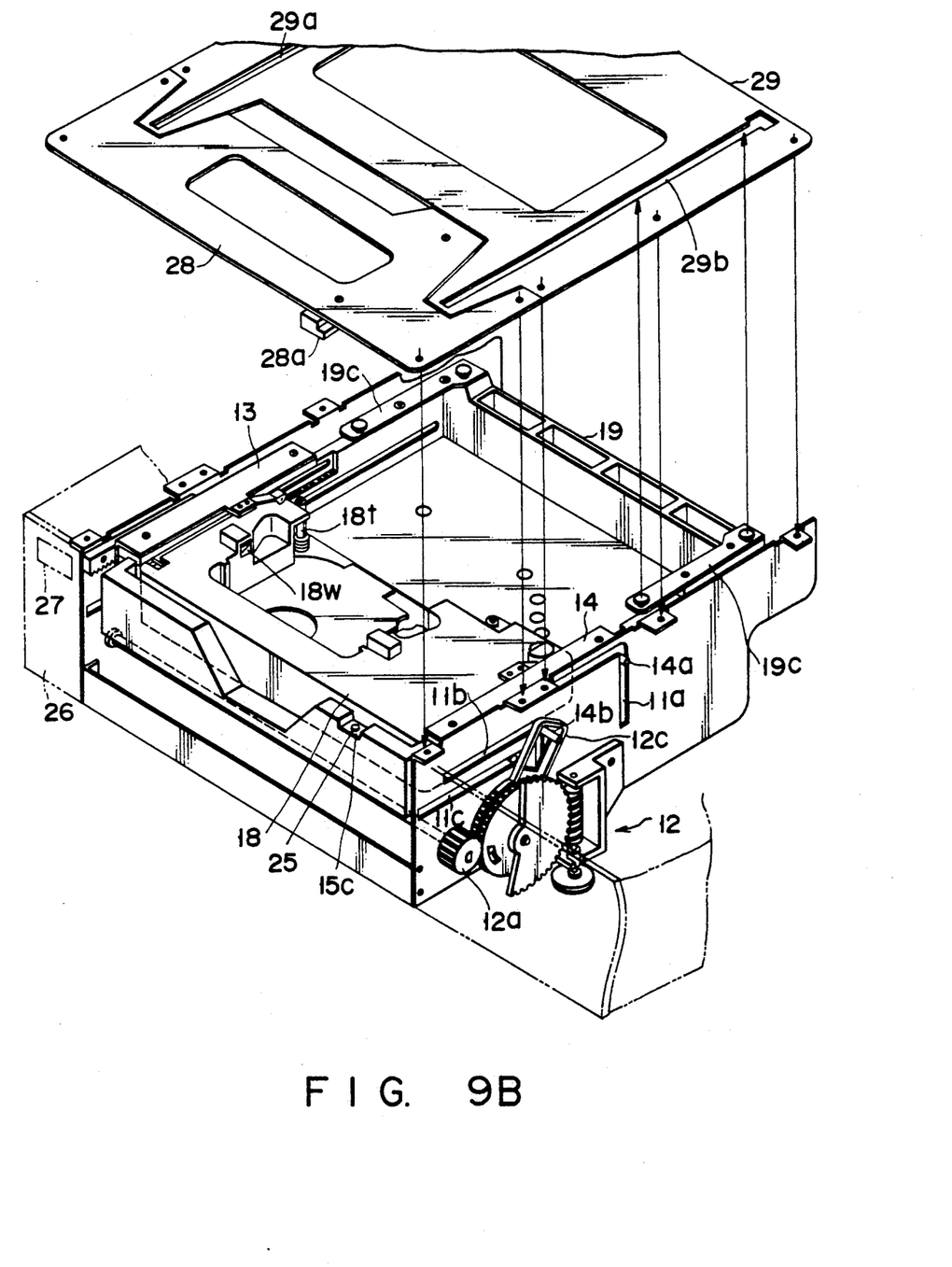
FIG. 9B is an exploded perspective view illustrating a tray being loaded into a cabinet.

Further, a recess 15c is formed at the front of the first tray 15, and a cassette selection manipulator 25 for selection of the cassette adapter is provided at the bottom of the recess. When an eject manipulator 27 provided at the front panel 26 is operated and the first tray 15 is ejected to the cassette inserting position protruding from the front panel 26 as described earlier (see FIG. 9A), the manipulator 25 is exposed so that it can be operated. When the eject manipulator 27 is not operated and the first tray 15 is held in the front panel 26 as shown in FIG. 9B, the manipulator 25 cannot be operated. When the manipulator 25 is operated, the built-in motor 18d is operated to control the driving of the mobile gears 18a and 18b. As a result, the C cassette adapter 18 is moved to the second tray 19 from the first tray 15 or vice versa, thus permitting the loading of the full cassette 16 or C cassette 17.

First and second support covers 28 and 29 are adhered on the first and second trays 15 and 19. The covers 28 and 29 are combined separably, and are respectively attached to the first and second side chassis 10 and 11. The second support cover 29 has guide holes 29a and 29b formed therein, and guide sections 19c (only one being shown in FIG. 1 for diagrammatic convenience) provided on the second tray 19 are movable attached to the guide holes 29a and 29b. A loading rack 28a is formed on the first support cover 28, and is engaged with the loading gear 18f. At the time the C cassette adapter 18 is moved between the first and second trays 15 and 19, this rack 28a rotates the loading gear 18f as described above to permit feeding or taking up of the tape 17b of the C cassette 17. The second tray 19 can be removed together with the second support cover 29 from the first support cover 28 and the first tray 15 by detaching the second support cover 29 from the first and second side chassis 10 and 11 at the cassette inserting position defined by the first tray 15 and the tape driving position. Accordingly, when the stand-by position of the second tray 19 is set on a tape driving mechanism 30 (see FIG. 11) including a cylinder on which the tape is mounted, the adjustment and maintenance of the device can easily be realized and about the same shape and dimension as those of the conventional device can be assured.

Cassette pressing spring members 31a and 31b are respectively provided on the first and second holder members 13 and 14. With the first and second holder members 13 and 14 being moved to the cassette inserting position, the spring members 31a and 31b are located in the second tray 19. When the first and second holder members 13 and 14 are moved to the tape driving position from the cassette inserting position, the holder members 13 and 14 are positioned in such a way that the full cassette 16 or C cassette adapter 18 accommodated in the first tray 15 abut on the first tray 15. In other words, using that the amount of movement of the first and second holder members 13 and 14 is smaller than the amount of movement of the first tray 15 due to the function of the aforementioned double-speed mechanism, the cassette pressing spring members 31a and 31b are separated from the first tray 15 to be on the second tray 19 at the cassette inserting position. The cassette pressing spring members 31a and 31b are provided on the first and second holder members 13 and 14 in such a way that when the first tray 15 is moved to the position B, the members 31a and 31b are located on the first tray 15. With the cassette pressing spring members 31a and 31b moved to the cassette inserting position, they can permit accommodation of the full cassette 16 on the first tray 15. Having reached the position B, the members 31a and 31b presses and holds the accommodated full cassette 16 on the first tray 15. With the C cassette adapter 18 in use, the members 31a and 31b likewise serve to press the C cassette adapter 18 against the first tray 15 and hold it thereon.

Figure 10:
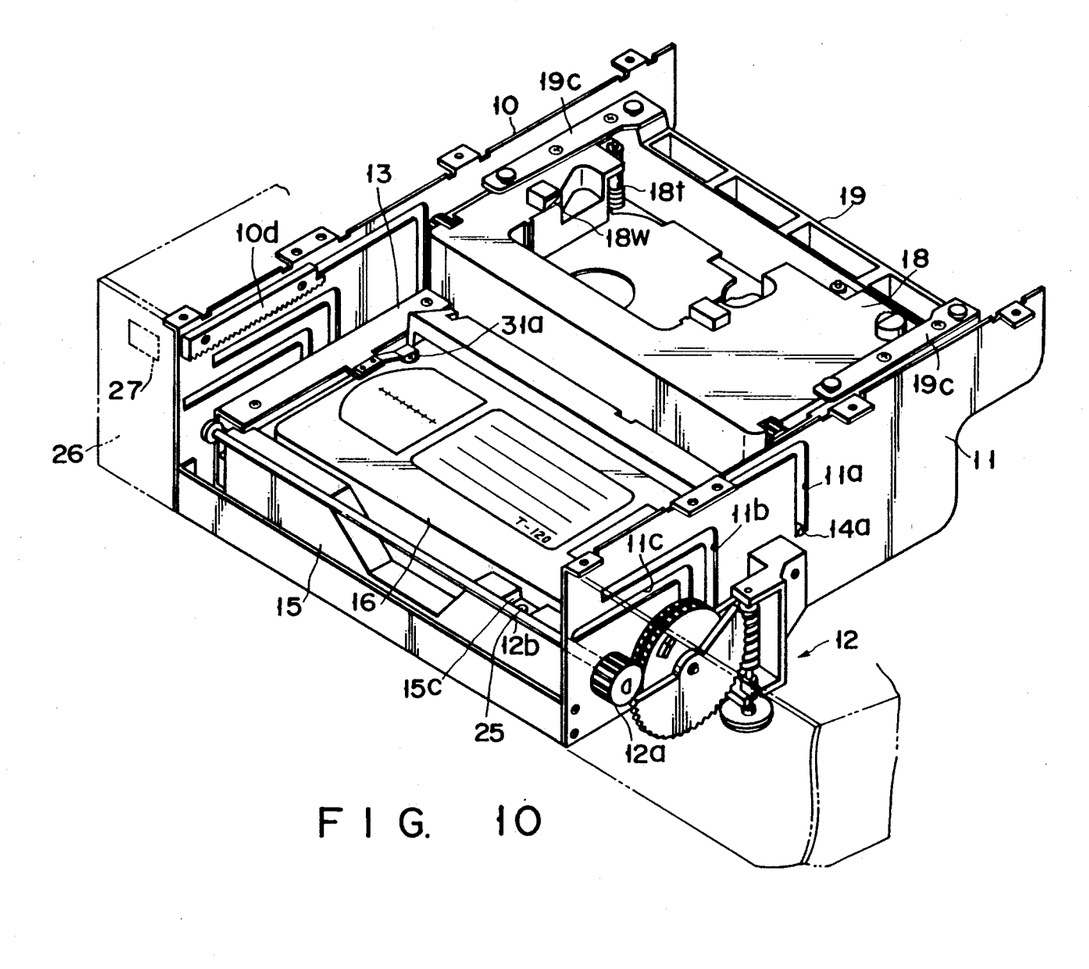
FIG. 10 is a perspective view illustrating the full cassette being loaded to a tape driving position.

The thus constituted cassette loading device is operated as follows. In loading the full cassette 16, first, the eject manipulator 27 is operated to eject the first tray 15 to the cassette inserting position in order to accommodate the full cassette 16. When the full cassette 16 is received in a predetermined state, a detection switch (not shown) detects the mounting of the full cassette and drives the tray moving mechanisms 12. The tray moving mechanisms 12 then urges the guide sections 14b of the first and second holder members 13 and holder members 13 and 14 are guided to the first to third guide holes 10a–10c and 11a–11c of the first and second side chassis 10 and 11 and are moved to the tape driving position, passing the position B. At this time, the double-speed gears 14d of the first and second holder members 13 and 14 are driven to the side racks 10d of the side chassis 10 and 11, and the driving force of the double-speed gears 14d is transmitted to the outer rack 15a of the first tray 15. As a result, the first tray 15 is carried to the position B at a speed twice as fast as the moving speed of the holder members 13 and 14. At this time, the cassette pressing spring members 31a and 31b provided on the holder members 13 and 14 are moved onto the first tray 15 to press the full cassette 16 against the first tray 15 and hold it there. When the holder members 13 and 14 are moved down to the position C from the position B, the double-speed gears 14d are disengaged from the side racks 10d and the first tray 15 is moved to the tape driving position interlockingly with the movement of the holder members 13 and 14, as shown in FIG. 10. The full cassette 16 held on the first tray 15 has its feed and take-up reels 161 and 162 mounted on a pair of feed and take-up reel stands 50a and 50b for driving the tape (see FIG. 2B). When the tape loading mechanism (not shown) is driven, the full cassette 16 has its tape set on the tape driving mechanism 30 (see FIG. 11). At this time, as the second tray 19 having been moved to the stand-by position is supported by the second support cover 29, it is disengaged from the coupling spring member 19a and is held at the stand-by position.

In removing the full cassette 16 loaded to the tape driving position, the eject manipulator 27 is operated again. Consequently, the tape loading mechanism is reversed to unload the tape, then the tray moving mechanisms 12 are reversed. The first and second holder portions 13 and 14 are moved upward to the position B from the position C. Then, the coupling spring member 19a of the first tray 15 is coupled to the second tray 19, and the double-speed gears 14d of the holder portions 13 and 14 are engaged with the side racks 10d of the first and second side chassis 10 and 11. When the holder portions 13 and 14 are moved to the position A from the position B, the moving speed of the holder portions 13 and 14 is doubled due to the action of the double-speed gears 14d and side racks 10d and the first tray 15 is moved to the cassette inserting position with the second tray 19 kept held. The full cassette 16 is popped up by the inclined portions 22a and 23a to be ready to be removed. At this time, the cassette pressing spring members 31a and 31b provided on the holder portions 13 and 14 are moved on the second tray 19 and are disengaged from the full cassette 16.

Figure 11:
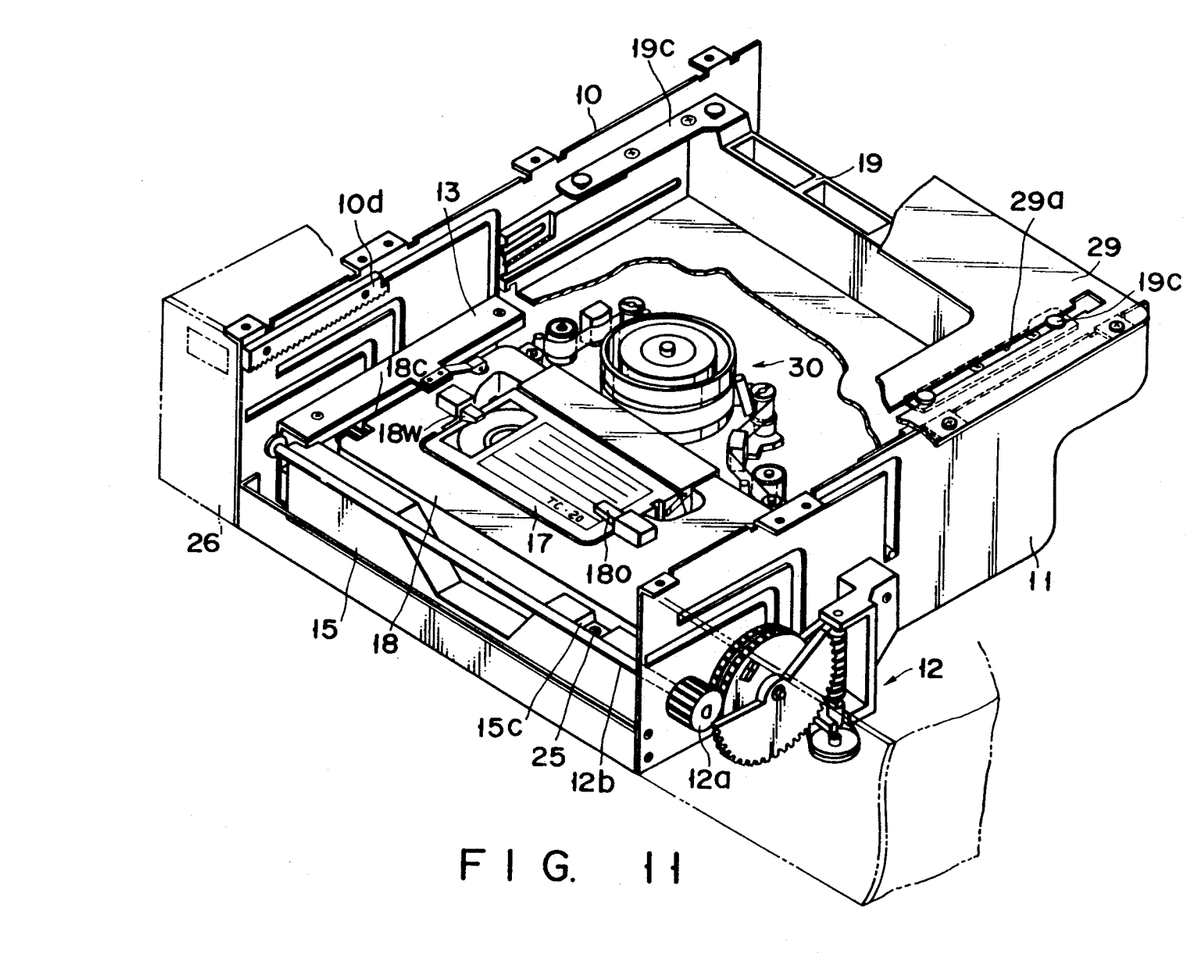
FIG. 11 is a perspective view illustrating the C cassette adapter being loaded to the tape driving position.

In using the C cassette 17, the eject manipulator 27 is likewise operated to eject the first tray 15 to the cassette inserting position, then the cassette selection manipulator 25 is operated. As a result, the built-in motor 18d is driven to drive the mobile gears 18a and 18b, and the C cassette adapter 18 is moved along the inner racks 15b and 19b provided in the first and second trays 15 and 19 to be carried onto the first tray 15 from the second tray 19. When the C cassette 17 is set in the C cassette adapter 18, the detection switch (not shown) detects this even and drives the tray mechanisms 12. The tray moving mechanisms 12 then urges the guide sections 14a–14c of the first and second holder members 13 and 14 through the loading arms 12c. As a result, the holder members 13 and 14 are guided to the first to third guide holes 10a–10c and 11a–11c of the first and second side chassis 10 and 11 and are moved to the tape driving position, passing the position B. At this time, the double-speed gears 14d of the first and second holder members 13 and 14 are driven to the side racks 10d of the side chassis 10 and 11, and the driving force of the double-speed gears 14d is transmitted to the outer rack 15a of the first tray 15. As a result, the first tray 15 is carried to the position B at a speed twice as fast as the moving speed of the holder members 13 and 14. At this time, the loading gear 18f of the C cassette adapter 18 is driven by the loading rack 28a, and the right and left loading arms 18l and 18s, the right and left cassette pressing members 18m and 18v and the take-up gear 17a are driven in the aforementioned manner to press and hold the C cassette 17. At the same time, the tape 17b of the C cassette 17 is fed out to a predetermined position to permit tape loading. At this time, the cassette pressing spring members 31a and 31b provided on the holder members 13 and 14 are moved onto the first tray 15 to press the C cassette adapter 18 against the first tray 15 and hold it there. When the holder members 13 and 14 are moved down to the position C from the position B, the double-speed gears 14d are disengaged from the side racks 10d and the first tray 15 is moved to the tape driving position interlockingly with the movement of the holder members 13 and 14, as shown in FIG. 11. The C cassette adapter 18 held on the first tray 15 has the feed reel 171 of the C cassette 17 mounted on the feed reel stand 50a for driving the tape, and has part of the gear transmitting mechanism 18g engaged with the take-up reel stand 50b in a manner to permit transmission of the driving force. When the tape loading mechanism (not shown) is driven, the C cassette 17 has its tape set on the tape driving mechanism 30. At this time, as the second tray 19 having been moved to the stand-by position is supported by the second support cover 29, it is disengaged from the coupling spring member 19a and is held at the stand-by position.

In removing the C cassette 17 loaded to the tape driving position, the eject manipulator 27 is operated again. Consequently, the tape loading mechanism is reversed to unload the tape, then the tray moving mechanisms 12 are reversed. The first and second holder portions 13 and 14 are moved upward to the position B from the position C. Then, the coupling spring member 19a of the first tray 15 is coupled to the second tray 19, and the double-speed gears 14d of the holder portions 13 and 14 are engaged with the side racks 10d of the first and second side chassis 10 and 11. When the holder portions 13 and 14 are moved to the position A from the position B, the moving speed of the holder portions 13 and 14 is doubled due to the action of the double-speed gears 14d and side racks 10d and the first tray 15 is moved to the cassette inserting position with the second tray 19 kept held. This permits the C cassette 17 in the C cassette adapter 18 to be removed. At this time, the loading gear 18f of the C cassette adapter 18 is driven in the reverse direction by the loading rack 28a. As a result, the right and left loading arms 18l and 18s, the right and left cassette pressing members 18m and 18v and the take-up gear 17a are driven to release the pressing of the C cassette 17 on the C cassette adapter 18 and take up the tape in the cassette.

As described above, the cassette loading device is designed such that the full cassette 16 and C cassette 17 are accommodated in a tray, which is constituted by the first and second trays 15 and 19, for example, and has been conveyed to the cassette inserting position, with their feed reels 161 and 171 coaxially positioned, and this tray is conveyed to the tape driving position by means of the tray moving mechanisms 12, thereby permitting the full cassette 16 and C cassette 17 to be loaded to the tape driving position through the tray. With this design, simply setting the full cassette 16 and the C cassette adapter 18 holding the C cassette 17 on the tray can protect these cassettes from any damage which may be caused at the time of loading or unloading the cassettes, thus ensuring a highly reliable cassette loading/unloading operation. Since the feed reel stand 50a at the tape driving position can be shared by the full cassette 16 and C cassette 17, the system for driving the cassette tape does not become complicated and the structure of the device can be kept as simple as that of the conventional device.

The cassette loading device is designed such that the second tray 19 which selectively receives the C cassette adapter 18 is detachably to the first tray 15, which is moved to the tape driving position from the cassette inserting position, interlockingly with the up-and-down movement of the first tray 15, so that the C cassette adapter 18 is moved on either the first tray 15 or second tray 19 depending on whether or not the adapter is used. In other words, with the full cassette 16 in use, the C cassette adapter 18 is set on the second tray 19 to permit loading of the full cassette 16 on the first tray 15, and with the C cassette 17 in use, the adapter 18 is moved on the first tray 15 to permit loading of the C cassette 17. This feature can permit the use of tape cassettes of different shapes, such as the full cassette 16 and C cassette 17, without requiring a separate adapter, thus ensuring a simple handing of the cassettes.

This invention is not limited to the above-described particular embodiment, but may be modified in various manners without departing from the scope and spirit of the invention.

What is claimed is:

1. A device for loading a first tape cassette or a second tape cassette, said second tape cassette being of smaller dimensions than the dimensions of said first tape cassette comprising:
   a body having a front panel;
   a tray means for inserting said first tape cassette or said second tape cassette, said tray means being movably provided between a first position at which said tray means protrudes from said front panel and a second position at which said first or said second tape cassette is loaded in a tape driving section arranged in said body; and
   a tray transporting mechanism for guiding said tray means to said first or second position, and loading said first or second tape cassette in said tape driving section when said tray transporting mechanism guides said tray means to said second position.

2. A device according to claim 1, wherein said tray means comprises:
   an adapter for receiving said second tape cassette;
   a tray for movably holding said adapter, and guiding said first tape cassette or said second tape cassette received in said adapter to said first or second position; and
   an adapter transporting mechanism for transporting said adapter to a cassette inserting position at which said second tape cassette can be received in said adapter, and a stand-by position at which said first tape cassette can be inserted in said tray.

3. A cassette loading device according to claim 1, wherein said tray means comprises:
   an adapter for receiving said second tape cassette;
   a first tray for holding said first tape cassette or said adapter, said first tray being movable between said first position and said second position;
   a second tray being movable between a third position which corresponds to said first tray being in said first position and a fourth position which corresponds to said first tray being in said second position, said adapter being selectively transportable between said first tray in said first position and said second tray in said third position;
   an adapter transporting mechanism for transporting said adapter between a cassette inserting position and a stand-by position, said cassette inserting position being when said adapter is transported from said second tray to said first tray when said first tray is in said first position so that said second tape cassette can be received in said adapter, and said stand-by position being when said adapter is transported from said first tray to said second tray so that said first tape cassette can be inserted in said first tray; and
   a tray coupling mechanism for disengaging said second tray from said first tray when said first tray is being transported from said first position to said second position, and engaging said second tray to said first tray when said first tray is being transported from said second position to said first position.

* * * * *